(12) United States Patent
Murashkin et al.

(10) Patent No.: US 11,433,902 B2
(45) Date of Patent: Sep. 6, 2022

(54) METHODS AND SYSTEMS FOR COMPUTER-BASED DETERMINING OF PRESENCE OF DYNAMIC OBJECTS

(71) Applicant: YANDEX SELF DRIVING GROUP LLC, Skolkovo (RU)

(72) Inventors: Vyacheslav Vladimirovich Murashkin, Moscow (RU); Andrey Olegovich Rykov, Snezhinsk (RU); Artem Andreevich Filatov, Perm (RU)

(73) Assignee: YANDEX SELF DRIVING GROUP LLC, Moscow (RU)

( * ) Notice: Subject to any disclaimer, the term of this patent is extended or adjusted under 35 U.S.C. 154(b) by 251 days.

(21) Appl. No.: 16/854,639

(22) Filed: Apr. 21, 2020

(65) Prior Publication Data

US 2020/0377105 A1    Dec. 3, 2020

(51) Int. Cl.
*B60W 40/00*    (2006.01)
*B60W 40/04*    (2006.01)
(Continued)

(52) U.S. Cl.
CPC ...... *B60W 40/04* (2013.01); *B60W 60/00272* (2020.02); *G06N 3/049* (2013.01); *G06N 20/00* (2019.01); *B60W 2420/52* (2013.01)

(58) Field of Classification Search
CPC ........ G06N 5/048; G06N 5/022; G06N 3/008; G06N 3/0427; G06N 3/123; G06N 7/00;
(Continued)

(56) References Cited

U.S. PATENT DOCUMENTS 6,675,094 B2    1/2004    Russell et al.
7,366,325 B2    4/2008    Fujimura et al.
(Continued)

FOREIGN PATENT DOCUMENTS

RU    2605812 C2    12/2016

OTHER PUBLICATIONS

Dequaire "Deep Tracking on the Move: Learning to Track the World from a Moving Vehicle using Recurrent Neural Networks", arXiv. org, Cornell University Library, 201 Olin Library Cornell University Ithaca, NY 14853, Sep. 29, 2016.
(Continued)

*Primary Examiner* — Ian Jen
(74) *Attorney, Agent, or Firm* — BCF LLP

(57) ABSTRACT

A method for determining a set of dynamic objects in sensor data representative of a surrounding area of a vehicle having sensors, the method being executed by a server, the server executing a machine learning algorithm (MLA). Sensor data is received, and the MLA generates, based on the sensor data, a set of feature vectors. Vehicle data indicative of a localization of the vehicle is received. The MLA generates, based on the set of feature vectors and the vehicle data, a tensor, the tensor including a grid representation of the surrounding area. The MLA generates an mobility mask indicative of grid cells occupied by at least one moving potential object in the grid, and a velocity mask indicative of a velocity associated with the at least one potential object in the grid. The MLA determines, based on the mobility mask and the velocity mask, the set of dynamic objects.

13 Claims, 8 Drawing Sheets

(51) Int. Cl.
*G06N 20/00* (2019.01)
*B60W 60/00* (2020.01)
*G06N 3/04* (2006.01)

(58) Field of Classification Search
CPC .......... G06N 3/00; G06N 5/02; G06N 5/043;
G06V 20/56; G06V 20/58; G06V 20/588;
G06V 10/82; G06V 20/584; G06V
20/582; G06V 20/63; G06V 40/10; G06V
20/597; G06V 20/59; G06V 10/751;
G06V 20/64; G06V 10/56; G06V 10/44;
G06V 10/454; G06V 10/462; G06V 10/50
See application file for complete search history.

(56) References Cited

U.S. PATENT DOCUMENTS

| | | | |
|---|---|---|---|
| 8,374,388 | B2 | 2/2013 | Stolkin et al. |
| 9,014,903 | B1 | 4/2015 | Zhu et al. |
| 9,110,163 | B2 | 8/2015 | Rogan |
| 9,111,444 | B2 | 8/2015 | Kaganovich et al. |
| 9,128,185 | B2 | 9/2015 | Zeng |
| 9,135,502 | B2 | 9/2015 | Haker et al. |
| 9,766,626 | B1 | 9/2017 | Zhu et al. |
| 9,823,661 | B2 | 11/2017 | Pink et al. |
| 10,108,867 | B1 | 10/2018 | Vallespi-Gonzalez et al. |
| 10,152,771 | B1 | 12/2018 | Li et al. |
| 10,156,850 | B1 | 12/2018 | Ansari et al. |
| 10,453,249 | B2 * | 10/2019 | Smirnov ............... G06T 3/4007 |
| 2013/0179382 | A1 | 7/2013 | Fritsch et al. |
| 2017/0356993 | A1 | 12/2017 | Lee et al. |
| 2018/0273030 | A1 | 9/2018 | Weldon et al. |
| 2018/0307944 | A1 | 10/2018 | Li et al. |
| 2018/0308250 | A1 | 10/2018 | Li et al. |
| 2018/0348346 | A1 | 12/2018 | Vallespi-Gonzalez et al. |
| 2018/0348374 | A1 | 12/2018 | Laddha et al. |
| 2018/0349746 | A1 | 12/2018 | Vallespi et al. |
| 2018/0364717 | A1 | 12/2018 | Douillard et al. |
| 2019/0113918 | A1 | 4/2019 | England et al. |
| 2019/0147250 | A1 | 5/2019 | Zhang et al. |

OTHER PUBLICATIONS

European Search Report dated Sep. 23, 2020 issued in respect of the related European Patent Application No. 20176386.9.
Russian Search Report dated Aug. 25, 2021 issued in respect of the counterpart Russian Patent Application No. RU2019116279.

* cited by examiner

METHODS AND SYSTEMS FOR COMPUTER-BASED DETERMINING OF PRESENCE OF DYNAMIC OBJECTS

CROSS-REFERENCE

The present application claims priority to Russian Patent Application No. 2019116279, entitled "Methods and Systems for Computer-Based Determining of Presence of Dynamic Objects", filed May 27, 2019, the entirety of which is incorporated herein by reference.

FIELD OF TECHNOLOGY

The present technology relates to computer-implemented methods and systems for determining presence of an object based on sensor data, and more specifically, to methods and systems for determining presence of moving objects around an autonomous vehicle.

BACKGROUND

Several computer based navigation systems that are configured for aiding navigation and/or control of vehicle have been proposed and implemented in the prior art. These systems range from more basic map-aided localization based solutions—i.e. use of a computer system to assist a driver in navigating a route from a starting point to a destination point; to more complex ones—computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control system implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with collision control system, which systems upon detection of the vehicle (or other obstacle) in front of the moving vehicle, slow down or stop the vehicle.

Some of the more advanced system provide for a fully autonomous driving of the vehicle without direct control from the operator (i.e. the driver). These autonomously vehicles include computer systems that can cause the vehicle to accelerate, break, stop, change lane and self-park.

One of the main technical challenges in implementing the above computer systems is the ability for the computer system to detect an object present around the vehicle—such as the vehicle in front of the present vehicle (the present vehicle having the computer system onboard), which vehicle in front may pose a risk/danger to the present vehicle and may require the computer system to take a corrective measure, be it breaking or otherwise changing speed, stopping or changing lanes. On a more granular level, the challenge of the object detection is not just the binary detection (presence or absence of the object), but the speed and accuracy associated with such an analysis and determination (especially avoiding "false negatives", whereby the system does not identify an object which is indeed present in front or around the vehicle).

The acuteness of this problem is illustrated by the following hypothetical scenario. Imagine that the self-driving or partially-autonomous vehicle is driving along the route. A child (or an adult, a pet, and the like) runs in front of the vehicle. It is imperative that the computer system controlling the vehicle detects the presence of the object fast and take corrective actions to avoid the collision. Naturally, the faster the computer system detects the presence of the object, the more time the computer system will have to determine the corrective action and to command the vehicle to execute the corrective action.

There are several object-detection methods known in the art.

United States Patent Application Publication No. 2018/0308250 A1 published on Oct. 25, 2018, assigned to TuSimple and entitled "System and Method for Vehicle Position and Velocity Estimation Based on Camera and Lidar Data" teaches a vehicle position and velocity estimation based on camera and LIDAR data. A particular embodiment includes: receiving input object data from a subsystem of an autonomous vehicle, the input object data including image data from an image generating device and distance data from a distance measuring device; determining a two-dimensional (2D) position of a proximate object near the autonomous vehicle using the image data received from the image generating device; tracking a three-dimensional (3D) position of the proximate object using the distance data received from the distance measuring device over a plurality of cycles and generating tracking data; determining a 3D position of the proximate object using the 2D position, the distance data received from the distance measuring device, and the tracking data; determining a velocity of the proximate object using the 3D position and the tracking data; and outputting the 3D position and velocity of the proximate object relative to the autonomous vehicle.

U.S. Pat. No. 9,110,163 B2 granted on Aug. 18, 2015, assigned to Uber Technologies Inc. and entitled "Lidar-based classification of object movement" teaches that within machine vision, object movement is often estimated by applying image evaluation techniques to visible light images, utilizing techniques such as perspective and parallax. The precision of such techniques may be limited due to visual distortions in the images, such as glare and shadows. Instead, lidar data may be available (e.g., for object avoidance in automated navigation), and may serve as a high-precision data source for such determinations. Respective lidar points of a lidar point cloud may be mapped to voxels of a three-dimensional voxel space, and voxel clusters may be identified as objects. The movement of the lidar points may be classified over time, and the respective objects may be classified as moving or stationary based on the classification of the lidar points associated with the object. This classification may yield precise results, because voxels in three-dimensional voxel space present clearly differentiable statuses when evaluated over time.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

Developer(s) of the present technology have appreciated at least one technical problem associated with the prior art approaches.

Developer have recognized that there is a need to detect dynamic objects in the surrounding area of the vehicle, such that dangerous scenarios may be avoided, by notifying the driver or by having a computer causing the vehicle to make a correction action.

Developers of the present technology are aware that a LIDAR sensor mounted on autonomous vehicles allows to acquire data and generate 3D point clouds, which is indicative of portions of objects in the surrounding area of the vehicle, which may allow to see objects that haven't been detect by other sensor, or detect object more accurate.

Developers have appreciated that estimating the motion between two LIDAR scans is a non-trivial task. Because of the sparse and non-uniform nature of LIDAR point clouds, as well as the missing appearance information, detection of objects and speed estimation of dynamic objects may be gruesome.

Further, in some instances, the MLA may not have previously "seen" or been trained on certain objects which may appear on the road, such as ATVs, three-wheelers, or other types of obstacles. In such cases due to the MLA not being able to recognize the object, some types of correctives actions may not be taken by the autonomous vehicle.

The present technology allows detecting any dynamic object and its estimated velocity in a surrounding area of the vehicle, where the dynamic object(s) may be detected in a class agnostic manner, i.e. without predicting its class, which allows detecting dynamic objects that the MLA has not previously been trained on.

In contrast with some prior art approaches, the present technology uses odometry information of the vehicle to compensate for ego-motion, instead of predicting it, which could allow more accurate representation of.

In some non-limiting embodiments, the present technology allows processing an unlimited sequence of LIDAR point clouds, which can allow real-time detection of dynamic objects. The real-time detection of the dynamic objects could allow the MLA to predict future location and velocity of the dynamic objects, which could allow the electronic device to control the autonomous vehicle to take corrective actions in real-time.

In accordance with a first broad aspect of the present technology, there is provided a computer-implemented method for determining a set of dynamic objects based on sensor data acquired by a sensor mounted on a vehicle, the method being executable by an electronic device. The electronic device is communicatively coupled to the sensor for collection of sensor data therefrom. The electronic device is configured to execute a machine learning algorithm (MLA) having been trained for object detection based on sensor data. The method comprises: receiving sensor data representative of a surrounding area of the vehicle; generating, by the MLA, based on the sensor data, a set of feature vectors of the surrounding area; receiving vehicle data indicative of a localization of the vehicle on a map; generating, by the MLA, based on the set of feature vectors and the vehicle data, a tensor, the tensor including a grid representation of the surrounding area; generating, by the MLA, based on the tensor: an mobility mask indicative of grid cells occupied by at least one potential object in the grid, and a velocity mask indicative of a velocity associated with the at least one potential object in the grid; and determining, by the MLA, based on the mobility mask and the velocity mask, the set of dynamic objects in the surrounding area of the vehicle.

In some implementations of the method, the sensor is a LIDAR sensor; and the sensor data includes a set of LIDAR point clouds, each LIDAR point cloud of the set of LIDAR point clouds being associated with a respective timestamp; and wherein the vehicle data includes a set of odometer parameters, each odometer parameters of the set of odometer parameters being associated with the respective timestamp.

In some implementations of the method, the odometer parameters include at least one of: gear, wheel rotation speed, inertial measurement unit (IMU) parameters, throttle, steering angle, and speed.

In some implementations of the method, the generating the set of feature vectors comprises: dividing a subset of LIDAR point clouds of the set of LIDAR point clouds into respective sets of voxels; applying voxel layers on the respective sets of voxels to obtain the set of feature vectors.

In some implementations of the method, the tensor is a 3D tensor representation; and the method further comprises, prior to the generating the 3D tensor representation: generating a set of 4D tensor representations based on the set of feature vectors; and wherein the generating the 3D tensor representation comprises stacking the plurality of 4D tensor representations to obtain the 3D tensor representation.

In some implementations of the method, the server executes a second MLA, the second MLA being a recurrent neural network (RNN); the 3D tensor representation is a corrected 3D tensor representation; and wherein the generating the corrected 3D tensor representation comprises correcting the 3D tensor representation based on the set of odometer parameters to obtain the 3D tensor representation.

In some implementations of the method, the server executes a third MLA, the third MLA being a residual neural network (ResNet); and the generating the mobility mask and the velocity mask is executed by the third MLA.

In some implementations of the method, the method further comprises determining, by a fourth MLA, based on the set of dynamics objects, a control procedure, the control procedure including instructions for at least one of: a change in direction of the vehicle, and a change in speed of the vehicle.

In some implementations of the method, the method further comprises transmitting, by the server to the vehicle, the control procedure.

In some implementations of the method, dynamic objects of the set of dynamic objects are not associated with a class.

In some implementations of the method, the set of dynamic objects comprises a first dynamic object of a first class and a second dynamic object of a second class.

In some implementations of the method, the determining, by the MLA, based on the mobility mask and the velocity mask, the set of dynamic objects in the surrounding area of the vehicle is executed independent of a class of a given object of the set of dynamic objects.

In some implementations of the method, the determining, by the MLA, based on the mobility mask and the velocity mask, the set of dynamic objects in the surrounding area of the vehicle further comprises determining, by the MLA, a predicted velocity for a given one of the set of dynamic objects.

In some implementations of the method, the determining is executed at a first moment in time, and wherein the method further comprises predicting, by the MLA, a future position of a given one of the set of dynamic objects at a second moment in time, the second moment in time being after the first moment in time.

In some implementations of the method, the predicting the future position is done at least in part based on the predicted velocity.

In some implementations of the method, the electronic device is one of: mounted on the vehicle and located remotely from the vehicle connected thereto via a communication network.

In accordance with another broad aspect of the present technology, there is provided an electronic device. The electronic device comprises: a processor; a non-transitory computer-readable medium comprising instructions, the instructions for executing at least a machine learning algorithm (MLA) having been trained for object detection based on sensor data, the method comprising; a communication interface for communicating with a sensor mounted on a vehicle. The processor, upon executing the instructions, is configured to: receive, via the communication interface, sensor data representative of a surrounding area of the vehicle, the sensor data having been collected by the sensor; generate, via the MLA, based on the sensor data, a set of feature vectors of the surrounding area; receive vehicle data indicative of a localization of the vehicle on a map; generate, via the MLA, based on the set of feature vectors and the vehicle data, a tensor, the tensor including a grid representation of the surrounding area; generate, via the MLA, based on the tensor: an mobility mask indicative of grid cells occupied by at least one potential object in the grid, and a velocity mask indicative of a velocity associated with the at least one potential object in the grid; and determine, via the MLA, based on the mobility mask and the velocity mask, the set of dynamic objects in the surrounding area of the vehicle.

In some implementations of the electronic device, the electronic device is one of mounted on the vehicle and is remote from the vehicle.

In accordance with yet another broad aspect of the present technology, there is provided a computer-implemented method for determining a presence of a dynamic object based on sensor data acquired by a sensor mounted on a vehicle, the method being executable by an electronic device, the electronic device communicatively coupled to the sensor for collection of sensor data therefrom, the electronic device executing a machine learning algorithm (MLA) having been trained for object detection based on sensor data. The method comprises: receiving sensor data representative of a surrounding area of the vehicle; generating, by the MLA, based on the sensor data, a set of feature vectors of the surrounding area; receiving vehicle data indicative of a localization of the vehicle on a map; generating, by the MLA, based on the set of feature vectors and the vehicle data, a tensor, the tensor including a grid representation of the surrounding area; generating, by the MLA, based on the tensor: an mobility mask indicative of grid cells occupied by at least one potential object in the grid, and a velocity mask indicative of a velocity associated with the at least one potential object in the grid; and determining, by the MLA, based on the mobility mask and the velocity mask, a probability of the presence of a dynamic object in the surrounding area of the vehicle.

In some implementations of the method, the electronic device is one of mounted on the vehicle and is remote from the vehicle.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

Figure 1:
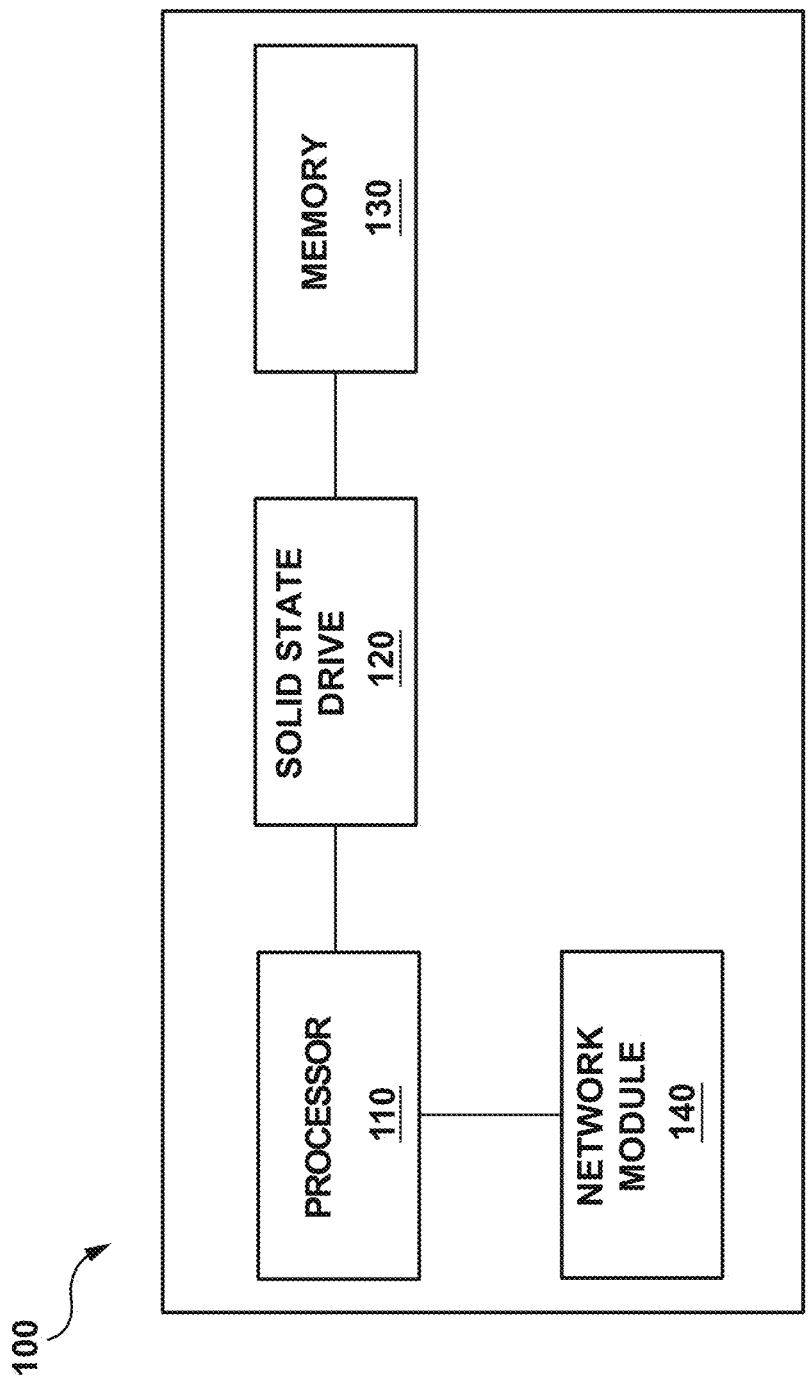
FIG. 1 depicts a schematic diagram of an example computer system for implementing certain embodiments of systems and/or methods of the present technology.

An Appendix A is provided at the end of the present specification. The Appendix A includes a copy of a yet to be published article entitled "Any Motion Detector: Predicting Scene Dynamics from a Sequence of LiDAR Point Clouds with Incomplete Supervision". This article provides additional background information, description of implementations of the non-limiting embodiments of the present technology, as well as some additional examples. The entirety of this article is incorporated herein by reference in its entirety, in all those jurisdictions where such incorporation by reference is allowed.

An Appendix B is provided at the end of the present specification. The Appendix B includes a copy of a yet to be published article entitled "Any Motion Detector: Learning Class-agnostic Scene Dynamics from a Sequence". This article provides additional background information, description of implementations of the non-limiting embodiments of the present technology, as well as some additional examples. The entirety of this article is incorporated herein by reference in its entirety, in all those jurisdictions where such incorporation by reference is allowed.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is shown a computer system 100 suitable for use with some implementations of the present technology, the computer system 100 comprising various hardware components including one or more single or multi-core processors collectively represented by processor 110, a solid-state drive 120, a memory 130, which may be a random-access memory or any other type of memory. Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components (not depicted), such as network communication modules, localization modules, and the like.

Networked Computer Environment

Figure 2:
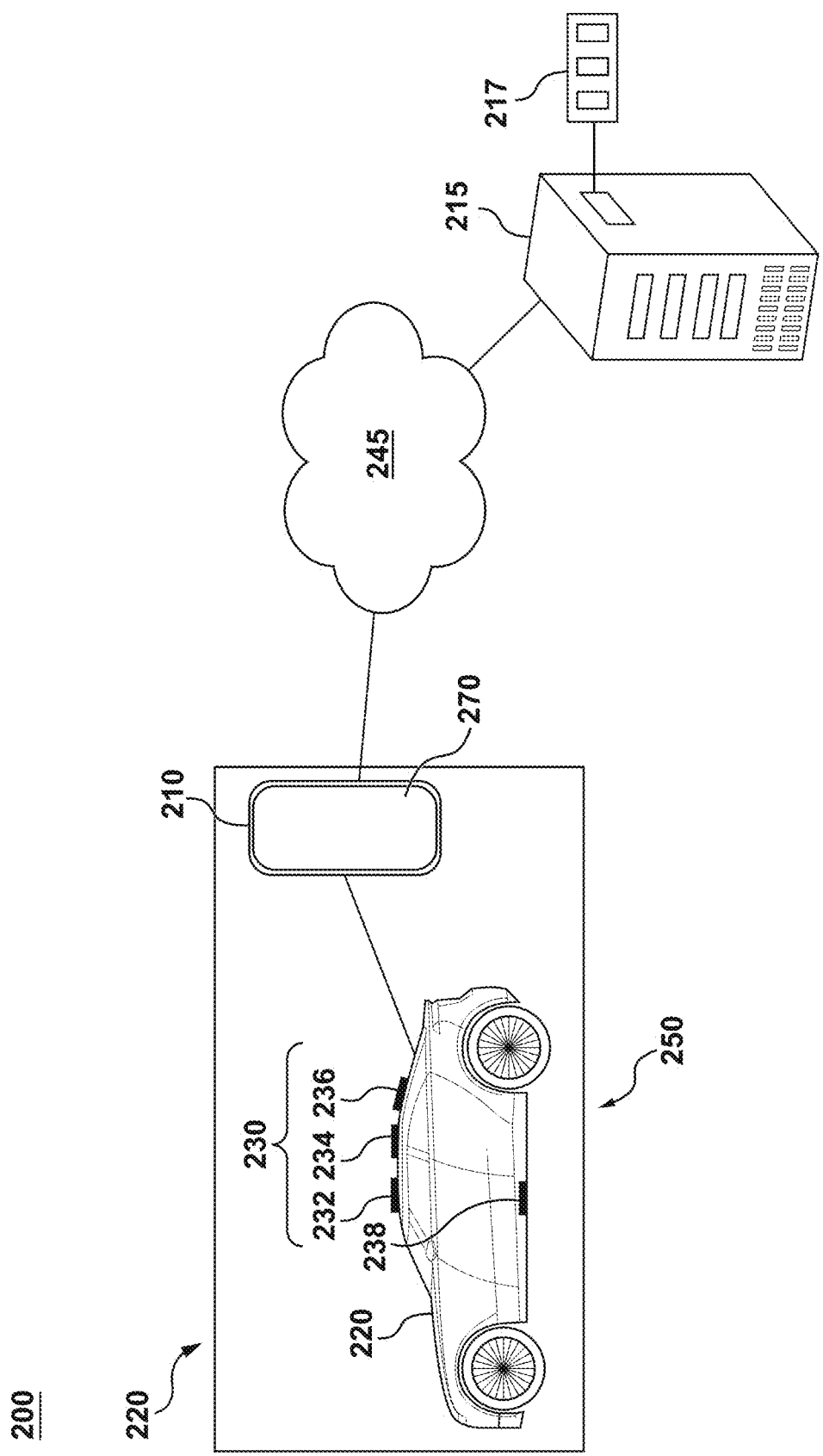
FIG. 2 depicts a networked computing environment being suitable for use with some implementations of the present technology.

FIG. 2 illustrates a networked computer environment 200 suitable for use with some embodiments of the systems and/or methods of the present technology. The networked computer environment 200 comprises an electronic device 210 associated with a vehicle 220, or associated with a user (not depicted) who can operate the vehicle 220, a server 215 in communication with the electronic device 210 via a communication network 245 (e.g. the Internet or the like, as will be described in greater detail herein below). Optionally, the networked computer environment 200 can also include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220 to which the electronic device 210 is associated may comprise any leisure or transportation vehicle such as a private or commercial car, truck, motorbike or the like. The vehicle may be user operated or a driver-less vehicle. It should be noted that specific parameters of the vehicle 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2× or 4×), tyre type, brake system, fuel system, mileage, vehicle identification number, and engine size.

The implementation of the electronic device 210 is not particularly limited, but as an example, the electronic device 210 may be implemented as a vehicle engine control unit, a vehicle CPU, a vehicle navigation device (e.g. TomTom™, Garmin™), a tablet, a personal computer built into the vehicle 220 and the like. Thus, it should be noted that the electronic device 210 may or may not be permanently associated with the vehicle 220. Additionally or alternatively, the electronic device 210 can be implemented in a wireless communication device such as a mobile telephone (e.g. a smart-phone or a radio-phone). In certain embodiments, the electronic device 210 has a display 270.

The electronic device 210 may comprise some or all of the components of the computer system 100 depicted in FIG. 1. In certain embodiments, the electronic device 210 is on-board computer device and comprises the processor 110, solid-state drive 120 and the memory 130. In other words, the electronic device 210 comprises hardware and/or software and/or firmware, or a combination thereof, for determining the presence of an object around the vehicle 220, as will be described in greater detail below.

In accordance to the non-limiting embodiments of the present technology, the electronic device 210 further comprises or has access to a plurality of sensors 230. The plurality of sensors 230 includes a first sensor 232 configured to capture an image of a surrounding area 250 and a second sensor 234 configured to capture LIDAR point cloud of the surrounding area 250. The first sensor 232 and the second sensor 234 are operatively coupled to the processor 110 for transmitting the so-captured information to the processor 110 for processing thereof, as will be described in greater detail herein below.

In some embodiments of the present technology, the electronic device 210 further comprises or has access to a third sensor 236 configured to capture RADAR data of the surrounding area 250 and operatively coupled to the processor 110 for transmitting so-captured information to the processor 110 for processing thereof.

Plurality of Sensors

First Sensor

In a specific non-limiting example, the first sensor 232 comprises a camera. How the camera is implemented is not particularly limited. For example, in one specific non-limiting embodiments of the present technology, the camera can be implemented as a mono camera with resolution sufficient to detect objects at pre-determined distances of up to about 30 m (although cameras with other resolutions and ranges are within the scope of the present disclosure). The camera can be mounted on an interior, upper portion of a windshield of the vehicle 220, but other locations are within the scope of the present disclosure, including on a back window, side windows, front hood, rooftop, front grill, or front bumper of the vehicle 220. In some non-limiting embodiments of the present technology, the first sensor 232 can be mounted in a dedicated enclosure (not depicted) mounted on the top of the vehicle 220.

In some non-limiting embodiments of the present technology, the first sensor 232 can be implemented as a plurality of cameras. For example, the plurality of cameras may have a sufficient number of cameras to capture a surrounding/panoramic image of the surrounding areas 250.

In some embodiments of the present technology, the camera (or one or more cameras that make up the implementation of the first sensor 232) is configured to capture a pre-determine portion of the surrounding area 250 around the vehicle 220. In some embodiments of the present technology, the camera is configured to capture an image (or a series of images) that represent approximately 90 degrees of the surrounding area 250 around the vehicle 220 that are along a movement path of the vehicle 220.

In other embodiments of the present technology, the camera is configured to capture an image (or a series of images) that represent approximately 180 degrees of the surrounding area 250 around the vehicle 220 that are along a movement path of the vehicle 220. In yet additional embodiments of the present technology, the camera is configured to capture an image (or a series of images) that represent approximately 360 degrees of the surrounding area 250 around the vehicle 220 that are along a movement path of the vehicle 220 (in other words, the entirety of the surrounding area around the vehicle 220).

In a specific non-limiting example, the first sensor 232 can be implemented as the camera may be of the type available from FLIR Integrated Imaging Solutions Inc., 12051 Riverside Way, Richmond, BC, V6W 1K7, Canada. It should be expressly understood that the first sensor 232 can be implemented in any other suitable equipment.

Second Sensor

In a specific non-limiting example, the second sensor 234 comprises a Light Detection and Ranging (LIDAR) instrument. Lidar stands for LIght Detection and Ranging. It is expected that a person skilled in the art will understand the functionality of the LIDAR instrument, but briefly speaking, a transmitter (not depicted) of the second sensor 234 implemented as the LIDAR sends out a laser pulse and the light particles (photons) are scattered back to a receiver (not depicted) the second sensor 234 implemented as the LIDAR instrument. The photons that come back to the receiver are collected with a telescope and counted as a function of time. Using the speed of light ($\sim 3\times10^8$ m/s), the processor 110 can then calculate how far the photons have traveled (in the round trip). Photons can be scattered back off of many different entities surrounding the vehicle 220, such as other particles (aerosols or molecules) in the atmosphere, other card, stationary objects or potential obstructions in front of the vehicle 220.

In a specific non-limiting example, the second sensor 234 can be implemented as the LIDAR based sensor that may be of the type available from Velodyne LiDAR, Inc. of 5521 Hellyer Avenue, San Jose, Calif. 95138, United States of America. It should be expressly understood that the second sensor 234 can be implemented in any other suitable equipment.

In some embodiments of the present technology, the second sensor 234 can be implemented as a plurality of LIDAR based sensor, such as three for example or any other suitable number. In some embodiments of the present technology, the second sensor 234 (whether implemented as a single LIDAR based sensor or multiple LIDAR based sensors) can be housed in the above-mentioned enclosure (not separately depicted) located on the roof of the vehicle 220.

In those embodiments of the present technology, where the second sensor 234 is implemented as multiple LIDAR based sensors housed in the enclosure (not depicted), the spatial placement of the multiple LIDAR based sensors can be designed taking into account the specific technical configuration of the multiple LIDAR based sensors, configuration of the enclosure, weather conditions of the area where the vehicle 220 is to be used (such as frequent rain, snow, and other elements) or the like.

Third Sensor

In a specific non-limiting example, the third sensor 236 comprises a RAdio Detection And Ranging (RADAR) instrument. Briefly speaking, a RADAR instrument is a detection instrument using radio waves to determine a range, angle and/or velocity of objects. The RADAR instrument includes a transmitter producing electromagnetic waves, an antenna used for transmitting and receiving electromagnetic waves, a receiver, and a processor to determine properties of the detected objects. In alternative embodiments of the present technology, there may be a separate antenna for receiving waves, and a separate antenna for transmitting waves. The processor used for determining properties of surrounding objects may be the processor 110.

In some embodiments of then present technology, the third sensor 236 may comprise long-range, medium-range and short-range RADAR sensors. As a non-limiting example, the long-range RADAR sensor may be used for adaptive cruise control, automatic emergency braking, and forward collision warning, while the medium and short-range RADAR sensors may be used for park assist, cross-traffic alert, junction assist, and blind side detection.

In a specific non-limiting example, the third sensor 236 may be of the type available from Robert Bosch GmbH of Robert-Bosch-Platz 1, 70839 Gerlingen, Germany. It should be expressly understood that the third sensor 236 can be implemented in any other suitable equipment.

In some embodiments of the present technology, the first sensor 232 and the second sensor 234 may be calibrated such that for the image captured by the first sensor 232 and the LIDAR point cloud captured by the second sensor 234, the processor 110 is configured to identify a given region of the image that correspond to a given region of the LIDAR point cloud captured by the second sensor 234. In other embodiments of the present technology, the first sensor 232, the second sensor 234, and the third sensor 236 are calibrated such that for the image captured by the first sensor 232, the LIDAR point cloud captured by the second sensor 234, and the RADAR data captured by the third sensor 236, the processor 110 is configured to identify a given region of the image that correspond to a given region of the LIDAR point cloud and the RADAR data.

The third sensor 236 may thus provide additional information to or enrich what is acquired by the first sensor 232 and/or second sensor 234. As a non-limiting example, it has been shown that in certain cases a RADAR sensor may perform better than a LIDAR instrument in particular weather conditions, such as fog, rain, snow, and dust. Further, a RADAR sensor may determine relative traffic speed or velocity of a moving object accurately using the Doppler frequency shift. Thus, the third sensor 236 may be used in combination with the first sensor 232, in combination with the second sensor 234, or in combination with the first sensor 232 and the second sensor 234. In some embodiments of the present technology, the third sensor 236 may only be used temporarily, such as in heavy weather condition for example.

Other Sensors

The vehicle 220 further comprises or has access to other sensors 238. The other sensors 238 include one or more of: an inertial measurement unit (IMU), a Global Navigation Satellite System (GNSS) instrument, ground speed RADARs, ultrasonic SONAR sensors, odometry sensors including accelerometers and gyroscopes, mechanical tilt sensors, magnetic compass, and other sensors allowing operation of the vehicle 220.

As a non-limiting example, the IMU may be fixed to the vehicle 220 and comprise three gyroscopes and three accelerometers for providing data on the rotational motion and linear motion of the vehicle 220, which may be used to calculate motion and position of the vehicle 220.

This calibration can be executed during the manufacturing and/or set up of the vehicle 220. Or at any suitable time thereafter or, in other words, the calibration can be executed during retrofitting the vehicle 220 with the first sensor 232, the second sensor 234, and the third sensor 236 in accordance with the non-limiting embodiments of the present technology contemplated herein. Alternatively, the calibration can be executed during equipping the vehicle 220 with the first sensor 232 and the second sensor 234, and the third sensor 236 in accordance with the non-limiting embodiments of the present technology contemplated herein.

Communication Network

In some embodiments of the present technology, the communication network 245 is the Internet. In alternative non-limiting embodiments, the communication network can be implemented as any suitable local area network (LAN), wide area network (WAN), a private communication network or the like. It should be expressly understood that implementations for the communication network are for illustration purposes only. A communication link (not separately numbered) between the electronic device 210 and the communication network 245 is implemented will depend inter alia on how the electronic device 210 is implemented. Merely as an example and not as a limitation, in those embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 245 may also use a wireless connection with the server 215.

Server

In some embodiments of the present technology, the server 215 is implemented as a conventional computer server and may comprise some or all of the components of the computer system 1 of FIG. 1. In one non-limiting example, the server 112 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 215 may be distributed and may be implemented via multiple servers.

In some non-limiting embodiments of the present technology, the processor 110 of the electronic device 210 can be in communication with the server 215 to receive one or more updates. The updates can be, but are not limited to, software updates, map updates, routes updates, weather updates, and the like. In some embodiments of the present technology, the processor 110 can also be configured to transmit to the server 215 certain operational data, such as routes traveled, traffic data, performance data, and the like. Some or all data transmitted between the vehicle 220 and the server 215 may be encrypted and/or anonymized.

The processor 110 of the server 215 has access to one or more MLAs 217. The

Overview of MLAs

There are many different types of MLAs known in the art. Broadly speaking, there are three types of MLAs: supervised learning based MLAs, unsupervised learning based MLAs and reinforcement learning based MLAs.

Supervised learning MLA process is based on a target—outcome variable (or dependent variable), which is to be predicted from a given set of predictors (independent variables). Using these set of variables, the MLA (during training) generates a function that maps inputs to desired outputs. The training process continues until the MLA achieves a desired level of accuracy on the validation data. Examples of supervised learning based MLAs include: Regression, Decision Tree, Random Forest, Logistic Regression, etc.

Unsupervised learning MLA does not involve a target or outcome variable to predict per se. Such MLAs are used for clustering a population of values into different groups, which is widely used for segmenting customers into different groups for specific intervention. Examples of unsupervised learning MLA include: Apriori algorithm, K-means.

Reinforcement learning MLA is trained to make specific decisions. During training, the MLA is exposed to a training environment where it trains itself continually using trial and error. The MLA learns from past experience and tries to capture the best possible knowledge to make accurate decisions. Example of reinforcement learning MLA is a Markov Decision Process.

It should be understood that different types of MLAs having different structures or topologies may be used for various tasks. One particular type of MLAs includes artificial neural networks (ANN), also known as neural networks (NN).

Neural Networks

Generally speaking, a given NN consists of an interconnected group of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modeled). During this training phase, the given NN adapts to the situation being learned and changes its structure such that the given NN will be able to provide reasonable predicted outputs for given inputs in a new situation (based on what was learned). Thus rather than try to determine a complex statistical arrangements or mathematical algorithms for a given situation; the given NN tries to provide an "intuitive" answer based on a "feeling" for a situation. The given NN is thus a kind of a trained "black box", which can be used in a situation when what is in the "box" is unimportant; it is only important that the "box" provide reasonable answers to given inputs.

NNs are commonly used in many such situations where it is only important to know an output based on a given input, but exactly how that output is derived is of lesser importance or is unimportant. For example, NNs are commonly used to optimize the distribution of web-traffic between servers and in data processing, including filtering, clustering, signal separation, compression, vector generation and the like.

Deep Neural Networks

In some non-limiting embodiments of the present technology, the NN can be implemented as a deep neural network. It should be understood that NNs can be classified into various classes of NNs and one of these classes comprises recurrent neural networks (RNNs).

Recurrent Neural Networks

RNNs are adapted to use their "internal states" (stored memory) to process sequences of inputs. This makes RNNs well-suited for tasks such as unsegmented handwriting recognition and speech recognition, for example. These internal states of the RNNs can be controlled and are referred to as "gated" states or "gated" memories.

It should also be noted that RNNs themselves can also be classified into various sub-classes of RNNs. For example, RNNs comprise Long Short-Term Memory (LSTM) networks, Gated Recurrent Units (GRUs), Bidirectional RNNs (BRNNs) and the like.

LSTM networks are deep learning systems that can learn tasks that require, in a sense, "memories" of events that happened during very short and discrete time steps earlier. Topologies of LSTM networks can vary based on specific tasks that they "learn" to perform. For example, LSTM networks may learn to perform tasks where relatively long delays occur between events or where events occur together at low and at high frequencies. RNNs having particular gated mechanisms are referred to as GRUs. Unlike LSTM networks, GRUs lack "output gates" and, therefore, have fewer parameters than LSTM networks. BRNNs may have "hidden layers" of neurons that are connected in opposite directions which may allow using information from past as well as future states.

Residual Neural Network (ResNet)

Another example of the NN that can be used to implement non-limiting embodiments of the present technology is a residual neural network (ResNet).

Deep networks naturally integrate low/mid/highlevel features and classifiers in an end-to-end multilayer fashion, and the "levels" of features can be enriched by the number of stacked layers (depth)

To summarize, the implementation of at least a portion of the one or more MLAs 217 in the context of the present technology can be broadly categorized into two phases—a training phase and an in-use phase. First, the given MLA is trained in the training phase. Then, once the given MLA knows what data to expect as inputs and what data to provide as outputs, the given MLA is actually run using in-use data in the in-use phase.

3D Map

In some embodiments of the present technology, the processor 110 is configured to receive data representative a 3D map (not depicted). The 3D map may be used by the vehicle 220 to predictably travel the road, by allowing the autonomous vehicle to acknowledge its own localization on the road 402, and by providing information about the environment and some surrounding object on the road 402 to the autonomous vehicle. It should be understood that the nature of the road 402 is not limited, and the road 402 may be any road that may be traveled by a vehicle to navigate the road 402 during a data acquisition procedure (not depicted in FIG. 2). In some non-limiting embodiments of the present technology, the 3D map may include one or more landmark objects on the road 402, such as road boundaries, lanes, signs, poles, and traffic lights, for example, which may help during navigation or object recognition.

Plurality of Computer-Implemented Procedures

The processor 110 is configured to execute a plurality of computer-implemented procedures 300 including: a data acquisition procedure 400, a voxel encoding procedure 500 or simply a voxel procedure 500, an odometry correction procedure 600, and a velocity estimation procedure 700. How the processor 110 is configured to execute the plurality of computer-implemented procedures will be described further below with reference to FIGS. 3 to 8. The processor 110 is configured to access and execute a plurality of machine learning algorithms (MLAs), in order to execute at least some of the plurality of computer-implemented procedures 300.

Figure 3:
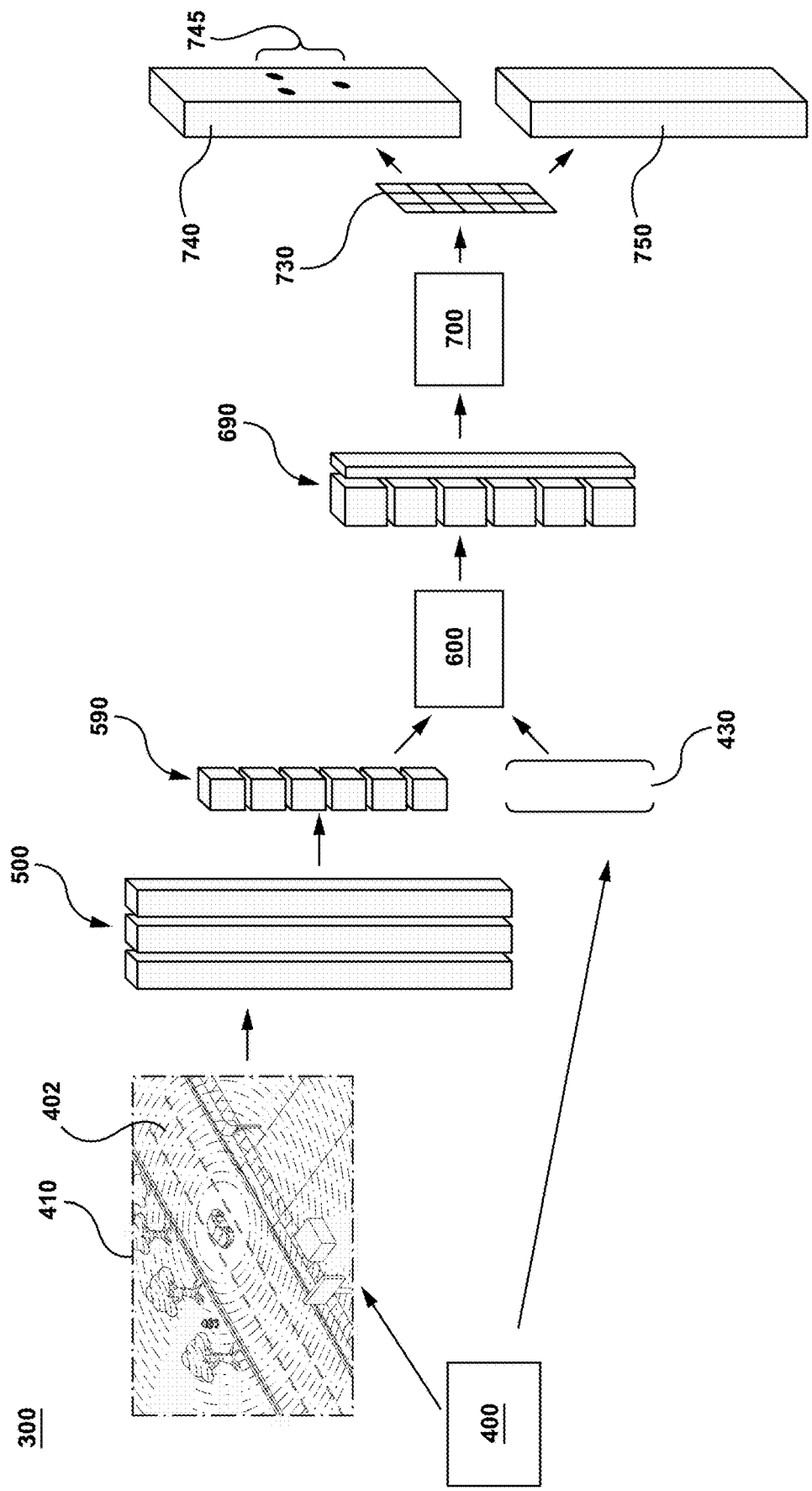
FIG. 3 depicts a schematic diagram of a plurality of computer-implemented procedures outlining the processing of at least a portion of the sensor data and the vehicle data by the processor 110 of the electronic device 210.

FIG. 3 depicts a schematic diagram of the plurality of computer-implemented procedures 300 outlining the processing of at least a portion of sensor data 405 and the vehicle parameters 432 by the processor 110 of the electronic device 210. More specifically, FIG. 3 depicts inputs and outputs of the computer-implemented procedures for detecting a set of dynamic objects 745.

The processor 110 is configured to execute the data acquisition procedure 400 in order to acquire data from at least a portion of the plurality of sensors 230, thereby generating the sensor data 405 including inter alia for each moment in time t: a LIDAR point cloud 412, and vehicle parameters 432. How the processor 110 is configured to execute the data acquisition procedure 400 will be described in greater detail herein below with reference to FIG. 4.

The processor 110 is configured to execute the voxel procedure 500 based on the sensor data 405 including the LIDAR point cloud 412, thereby generating a 3D tensor representation 590. How the processor 110 is configured to execute the voxel procedure 500 will be described in greater detail herein below with reference to FIG. 5.

The processor 110 is configured to execute the odometry correction procedure 600 based on (i) the 3D tensor representation 590 and (ii) the vehicle parameters 432, thereby generating a corrected 3D tensor representation 690. How the processor 110 is configured to execute the odometry correction procedure 600 will be described in greater detail herein below with reference to FIG. 6.

The processor 110 is configured to execute the velocity estimation procedure 700 based on the corrected 3D tensor representation 690, thereby generating a set of dynamic objects 745. How the processor 110 is configured to execute the velocity estimation procedure 700 will be described in greater detail herein below with reference to FIG. 7.

The processor 110 is configured to execute the training procedure to train at least a portion of the one or more MLAs 217. How the processor 110 is configured to execute the training procedure will be described in greater detail herein below.

Figure 4:
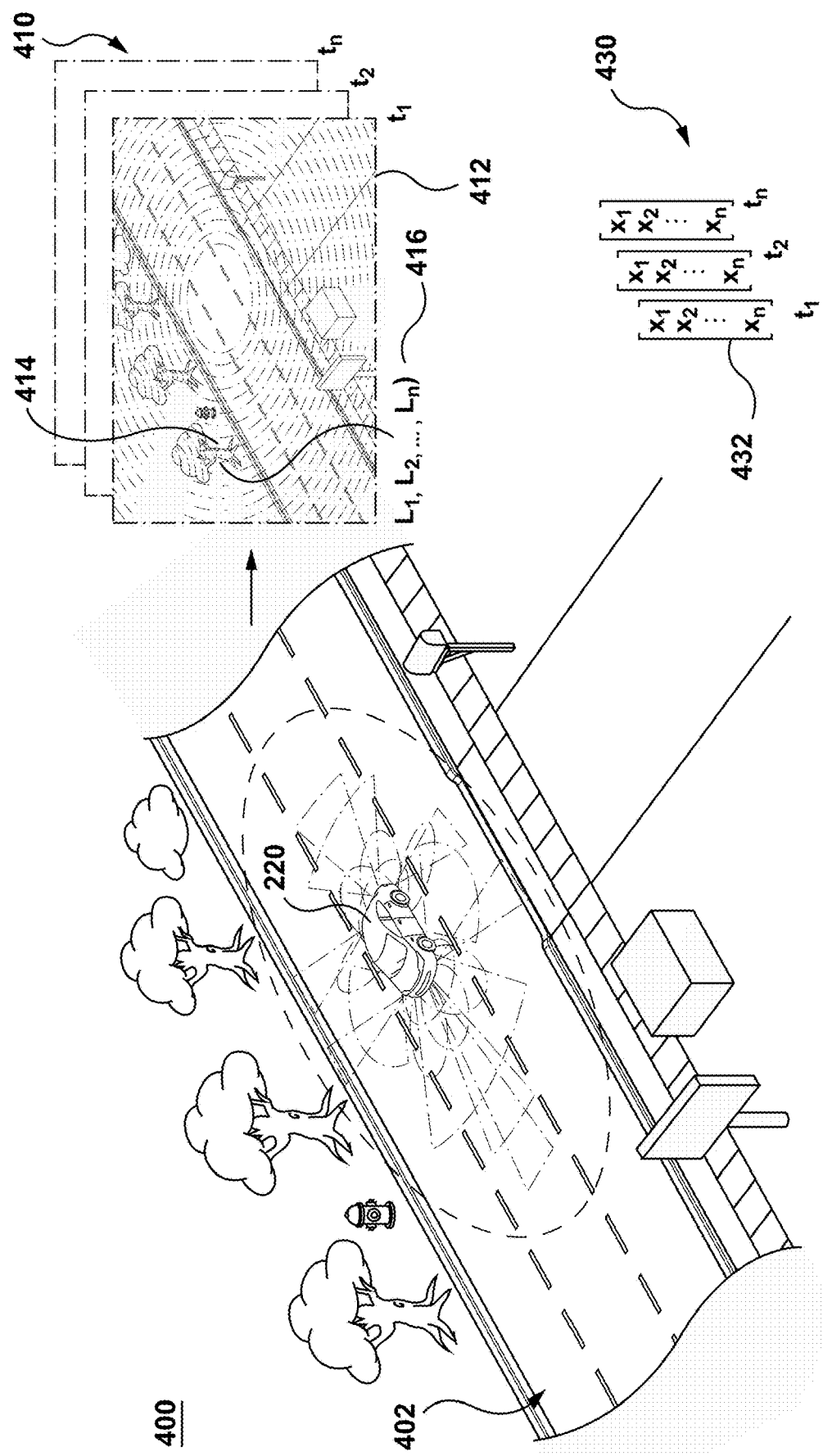
FIG. 4 depicts a schematic diagram of a data acquisition procedure captured by a portion of the plurality of sensors in accordance with non-limiting embodiments of the present technology

Now turning to FIG. 4, the data acquisition procedure 400 will be described in more detail in accordance with non-limiting embodiments of the present technology.

Data Acquisition Procedure

To execute the data acquisition procedure 400, the vehicle 220 travels on the road 402, and the electronic device 210 is configured to acquire with at least a portion of the plurality of sensors 230, sensor data 405 representative of objects in the surrounding area 250 of the vehicle 220.

Generally speaking, the purpose of the data acquisition procedure 400 is to, acquire, for each time step, inter alia: (i) a LIDAR point cloud 412; and (ii) vehicle parameters 432.

In the context of the present technology, the at least portion of the plurality of sensors 230 includes at least the second sensor 234.

LIDAR Point Cloud

The vehicle 220 travels on the road 402, and the electronic device 210 is configured to cause the second sensor 234 to acquire data about the surrounding area 250 of the vehicle 220 at different locations on the road 402.

The electronic device 210 receives data about the surrounding area 250 of the vehicle 220 at different locations on the road 402 in the form of LIDAR point cloud 412.

Generally speaking, the LIDAR point cloud 412 is a set of LIDAR points in the form of a 3D point cloud, where a given LIDAR point 414 is a point in 3D space indicative of at least a portion of a surface of a given object on the road 402. In some embodiments of the present technology, the LIDAR point cloud 412 may be organized in layers, where points in each layer are also organized in an elliptical fashion and the starting points of all elliptical layers are considered to share a similar orientation.

The given LIDAR point 414 in the LIDAR point cloud 412 is associated with LIDAR parameters 416. As a non-limiting example, the LIDAR parameters 416 may include: distance, intensity, and angle, as well as other parameters relating to information that may be acquired by a LIDAR sensor.

The second sensor 234 may acquire a LIDAR point cloud at each time step t while the vehicle 220 is traveling, thereby acquiring a set of LIDAR point clouds 410.

It is contemplated that in some non-limiting embodiments of the present technology, the vehicle 220 acquires image with the first sensor 232 and RADAR data with the third sensor 236.

Vehicle Data

The other sensors 238 are configured to acquire vehicle parameters 432. In some embodiments of the present technology, the electronic device 210 is configured to cause at least a portion of the other sensors 238 to acquire the vehicle parameters 432. In other embodiments of the present technology, the other sensors 238 may acquire vehicle parameters 432 independently from the electronic device 210 and transmit the vehicle parameters 432 thereto.

Generally speaking, the vehicle parameters 432 include parameters that are indicative of a localization of the vehicle 220. The localization of the vehicle 220 may be augmented by information in a 3D map (not depicted).

In the context of the present technology, the vehicle parameters 432 are used to correct data acquired by the plurality of sensors 230 such that it is represented in a single coordinate system, as the vehicle 220 may be moving at different speeds and performing different maneuver while acquiring each of the set of LIDAR point clouds 410.

The vehicle parameters 432 include, as a non-limiting example: latitude, longitude, gear, wheel rotation speed, inertial measurement unit (IMU) values (i.e. linear acceleration components and rotational rate components of the vehicle 220), throttle, steering angle, and speed, as well as other parameters relating to the vehicle 220 traveling on the road 402.

The other parameters of the vehicle parameters 432 may include, as a non-limiting example: a timestamp, and any other parameter that may be useful for processing the LIDAR point cloud 412, such as weather conditions, and the like.

The data acquisition procedure 400 outputs, for each given moment in time t: a LIDAR point cloud 412, and a vehicle parameters 432.

Thus, while the vehicle 220 travels on the road 402 during a given time period, the data acquisition procedure 400 acquires a set of LIDAR point clouds 410, and a set of vehicle parameters 430.

Figure 5:
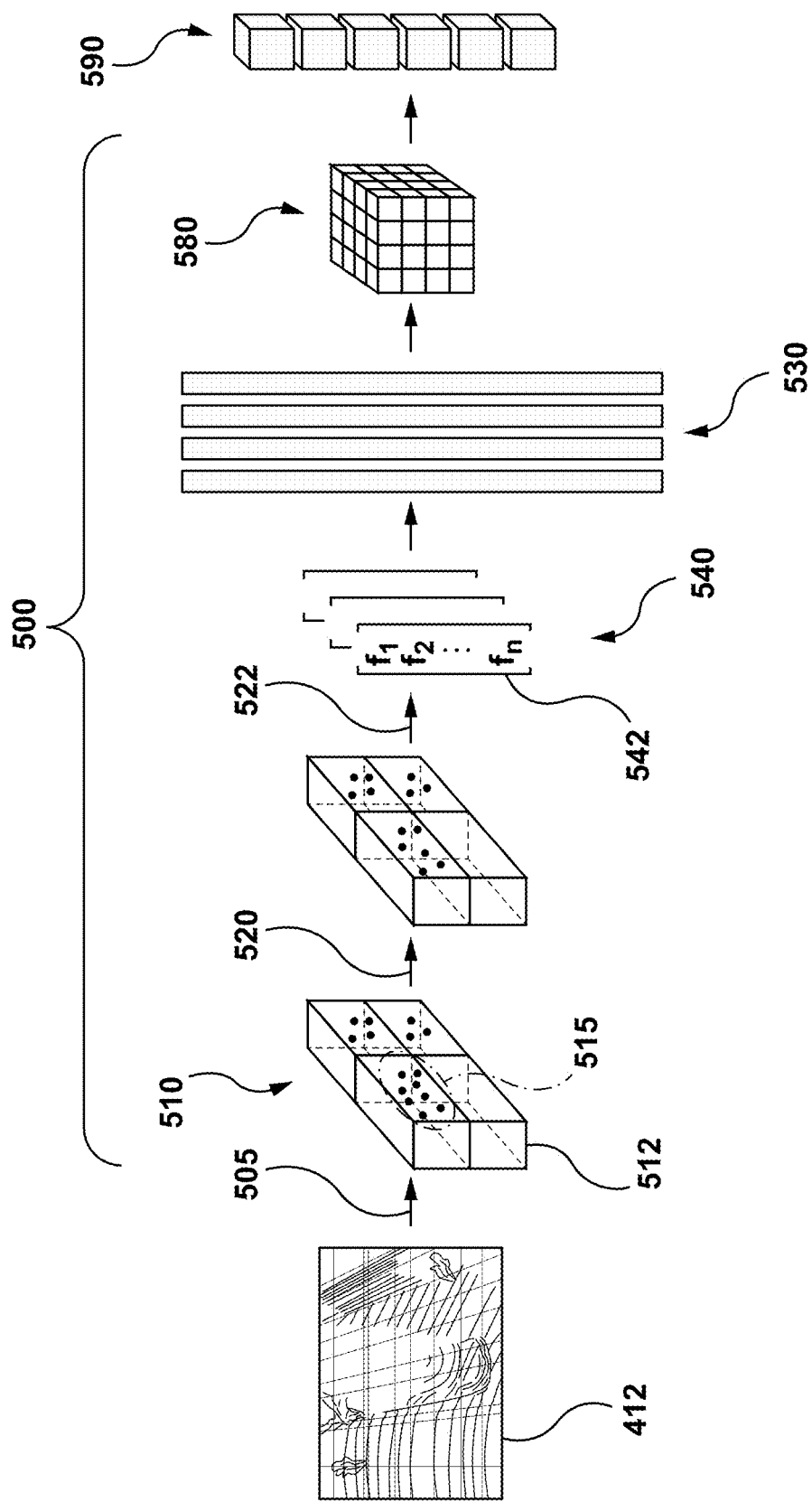
FIG. 5 depicts a schematic diagram of a voxel encoding procedure executed by the processor of the electronic device of FIG. 1 in accordance with non-limiting embodiments of the present technology

Now turning to FIG. 5, the voxel procedure 500 executable by the electronic device 210 will be described in more detail in accordance with non-limiting embodiments of the present technology.

The voxel procedure 500 will be described for a single LIDAR point cloud 412 of the set of LIDAR point clouds 410, the LIDAR point cloud 412 having been acquired for a given moment in time t.

It should be noted that the voxel procedure 500 can be executed continuously by the electronic device 210 for each given LIDAR point cloud 412 of the set of LIDAR point clouds 410.

Voxel Procedure

The voxel procedure 500 receives the LIDAR point cloud 412 as an input.

Generally speaking, the purpose of the voxel procedure 500 is to: (i) split the LIDAR point cloud 412 into a set of voxels 510; (ii) apply a set of voxel layers on the set of voxels 510 to obtain a set of feature vectors 540; and (iii) generate a 4D tensor representation 580 based on the set of feature vectors 540.

Voxel Partition

The voxel procedure 500 splits the LIDAR point cloud 412 into a set of voxels 510 by applying a voxelization procedure 505.

Briefly speaking, a voxel represents a value on a regular grid in three-dimensional space, and the position of a voxel is inferred relative to other voxels. Voxels may be explicitly represented by the coordinates of their vertices.

In the embodiment illustrated herein, each voxel 512 of the set of voxels 510 is equally spaced. As a non-limiting example, the set of voxels 510 may encompass 3D space with range D, H, W along the Z, Y, X axes respectively, and each voxel 512 may be of size $v_D$, $v_H$, and $v_W$, accordingly. The set of voxels 510 results in a 3D voxel grid of size $D=D/v_D$, $H=H/v_H$, $W=W/v_W$, where assume D, H, W are a multiple of $v_D$, $v_H$, $v_W$.

Each voxel 512 of the set of voxels 510 includes a respective subset of LIDAR points 515 from the LIDAR point cloud 412. It should be understood that a density of LIDAR points in each respective subset of LIDAR points 515 may be different, due to factors such as distance, occlusion, object's relative pose, and non-uniform sampling.

The voxel procedure 500 groups the LIDAR points according to the respective voxel 512 in the set of voxels 510 they are located in.

Random Sampling

In some embodiments of the present technology, the voxel procedure 500 may execute random sampling 520 of the LIDAR point cloud 412. The voxel procedure 500 executes random sampling 520 of the points to reduce memory burden, improve efficiency, and to decrease imbalance in LIDAR point density in voxels to reduce sampling bias. As a non-limiting example, the voxel procedure 500 may select voxels (not depicted) in the set of voxels 510 having a number of LIDAR points above a predetermined threshold, and sample a predetermined number of points from those voxels.

Stacked Voxel Layers

The voxel procedure 500 executes stacked voxel feature encoding 522 of a given voxel 512 of the set of voxels 510, which encodes point interactions within the given voxel 512 and allows to represent the given voxel 512 as a feature vector 542, the feature vector 542 having descriptive shape information of objects in the surrounding area 250 of the vehicle 220. Generally speaking, the feature vector 542 of the given voxel 512 encodes local and geometric properties of the respective subset of LIDAR points 515 contained therein.

In some non-limiting embodiments of the present technology, the voxel procedure 500 may process a given voxel 512 of the set of voxels 510, as an example by augmenting each LIDAR point in the given voxel 512 with a relative offset with respect to a local mean of the given voxel 512.

Generally speaking, each voxel is transformed through a fully connected network (FCN) of layers into a feature space (not depicted), where information from each point is aggregated such that a shape of the surface contained within the given voxel 512 is encoded in a respective feature vector 542. In some embodiments of the present technology, the FCN may be composed of a linear layer, a batch normalization (BN) layer, and a rectifier linear unit (ReLU) layer.

The voxel procedure 500 outputs a respective feature vector 542 for the given voxel 512 of the set of voxels 510, to obtain the set of feature vectors 540 for the set of voxels 510. It should be noted that in some embodiments of the present technology, at least one voxel in the set of voxels 510 may be empty (i.e. contain no LIDAR point), and in such cases, the at least one voxel may not be processed or may be replaced by an indication that it is empty.

Each respective feature vector 542 of the set of feature vectors 540 describes a local region of the scene captured in the sensor data 405.

Tensor Representation

The voxel procedure 500 processes the set of feature vectors 540 to obtain a 4D tensor representation 580. As the set of voxels 510 includes only non-empty voxels, the given feature vector 542 is associated with spatial coordinates of a given non-empty voxel. The voxel procedure 500 processes (depicted at 530) the set of feature vectors 540 to obtain a 4D tensor representation 580, the 4D tensor representation 580 being a sparse tensor representation of the set of feature vectors 540.

As a non-limiting example, the 4D tensor representation 580 of the set of feature vectors 540 may be of size C×D'×H'×W'.

The voxel procedure 500 stacks feature in the 4D tensor representation 580 to obtain a 3D tensor representation 590.

The voxel procedure 500 outputs the 3D tensor representation 590.

Figure 6:
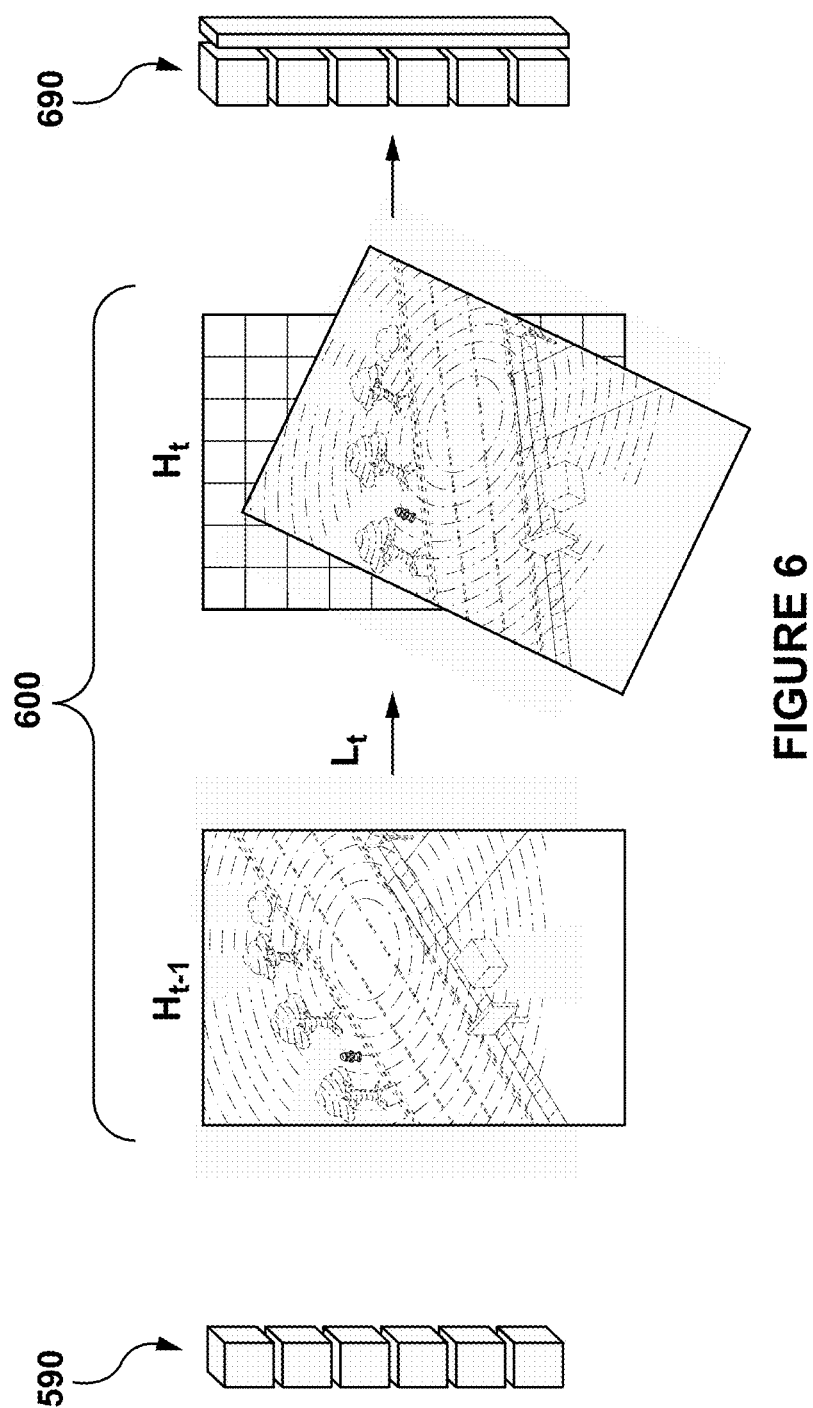
FIG. 6 depicts a schematic diagram of an odometry correction procedure executed by the processor of the electronic device of FIG. 1 in accordance with non-limiting embodiments of the present technology

Now turning to FIG. 6, the odometry correction procedure 600 executable by the electronic device 210 will be described in more detail.

Odometry Correction Procedure

The odometry correction procedure 600 receives as an input the 3D tensor representation 590.

Generally speaking, the purpose of the odometry correction procedure 600 is to process the 3D tensor representation 590, which stores a voxelized representation of the surrounding area of the vehicle 220, to preserve a geometrical correspondence between cells and a current local coordinate system of the vehicle 220.

The odometry correction procedure 600 processes the 3D tensor representation 590 based on the vehicle parameters 432, to compensate for ego-motion of the plurality of sensors 230, i.e. for compensate for motion of the plurality of sensors 230 during the data acquisition procedure 400 in the surrounding area 250 of the vehicle 220.

In some embodiments of the present technology, the odometry correction procedure 600 is executed by a recurrent neural network (RNN). The odometry correction procedure 600 takes a hidden tensor and applies an affine transform to using the odometry between the previous and the current frames which preserves the alignment of the hidden state tensor and a current point cloud bird eye view representation.

The odometry correction procedure 600 processes the 3D tensor representation 590 based on the vehicle parameters 432 and performs 2D convolutions to obtain a corrected 3D tensor representation 690.

The odometry correction procedure 600 outputs the corrected 3D tensor representation 690.

It should be noted that in some embodiments of the present technology, the odometry correction procedure 600 may be executed by a GRU RNN or a LSTM RNN.

Figure 7:
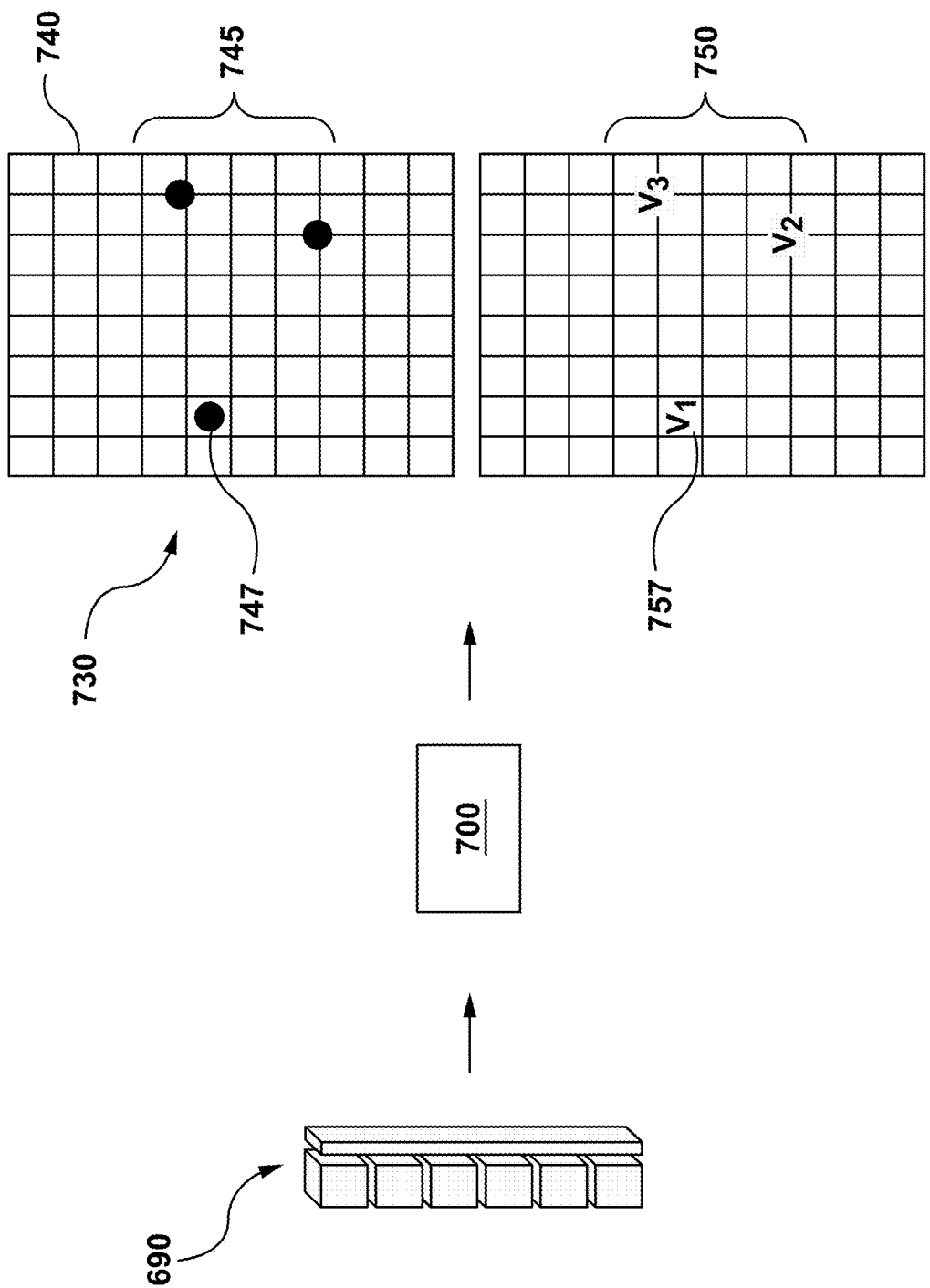
FIG. 7 depicts a schematic diagram of a velocity estimation procedure executed by the processor of the electronic device of FIG. 1 in accordance with non-limiting embodiments of the present technology

With reference to FIG. 7, the velocity estimation procedure 700 executable by the electronic device 210 will be described in more detail.

Velocity Estimation Procedure

The velocity estimation procedure 700 receives as an input the corrected 3D tensor representation 690.

Generally speaking, the purpose of the velocity estimation procedure 700 is to process the corrected 3D tensor representation 690 to obtain a grid representation 730 of a set of dynamic objects 745 in a surrounding area 250 of the vehicle 220, the grid representation 730 including a segmentation mask 740 and a velocity mask 750.

The segmentation mask 740 of the surrounding area 250 is a mask which indicates presence of at least one dynamic object 747 in a given cell of the grid representation 730 of the surrounding area 250.

The velocity mask 750 of the surrounding area 250 is a mask which indicates, for each of the at least one dynamic object of the segmentation mask 740 in the given cell, a respective estimated velocity 757.

The velocity estimation procedure 700 may be executed by a Residual network (ResNet). In some embodiments of the present technology, the ResNet may be an 18-layer ResNet. In other embodiments of the present technology, the ResNet may be a 34-layer ResNet.

The velocity estimation procedure 700 upscales the corrected 3D tensor representation 690 to match a grid size H, and attach two separate heads which include several convolutions, batch normalizations, Rectified Linear Unit (ReLu) blocks to obtain the segmentation mask 740, and the velocity mask 750.

Training Procedure

The server 215 is configured to train the one or more MLAs 217.

In some non-limiting embodiments of the present technology, the training the one or more MLAs 217 can be implemented as follows. The training data set can include a large number (such, as for example, more than 80000 scenes) with human-labeled cars and pedestrians on the 3D scene. The dataset can contain 32 laser LIDAR point clouds for each cell. A labeling procedure described above can be used to label all the scenes with dynamic grids.

Loss Function that can be used for training can be expressed as:

$$L = L_v + \alpha \cdot L_s + \beta \cdot L_r \qquad \text{Equation 1}$$

For segmentation, cross-entropy loss can be weighted by class. The velocity loss is defined as Smooth L1 loss that is calculated separately for two coordinates. Velocity loss is calculated only for those cells where ground truth is available. This allows the model to make correct predictions for dynamic objects that do not have ground truth and learn the general movement of objects.

$$L_v = 1/H \cdot W \Sigma_{(h,w) \in 0_c} \text{Smooth} L_1(v_{h,w}, \hat{v}_{h,w})$$

Equation 2

Corrective Actions

In some non-limiting embodiments of the present technology, the output of the velocity estimation procedure 700 (either one or both of the segmentation mask 740 and the velocity mask 750) is provided to the processor 110. The processor 110 may have different software routines accessible thereto for taking various actions based on the class of the object.

For example, there could be different routines based on whether the object present in the surrounding area 250 is another vehicle or a human. The different routines may cause the vehicle 220 to slow down, to stop, to change lanes, to increase speed and the like. One should appreciate that the exact routine and action caused for the vehicle 220 to execute is not particularly limited and will depend on the specific implementation of the present technology.

Method Description

Given the architecture described with reference to FIG. 1 to FIG. 7, it is possible to execute a method of predicting a presence of an object in the surrounding area 250 of the vehicle 220.

Figure 8:
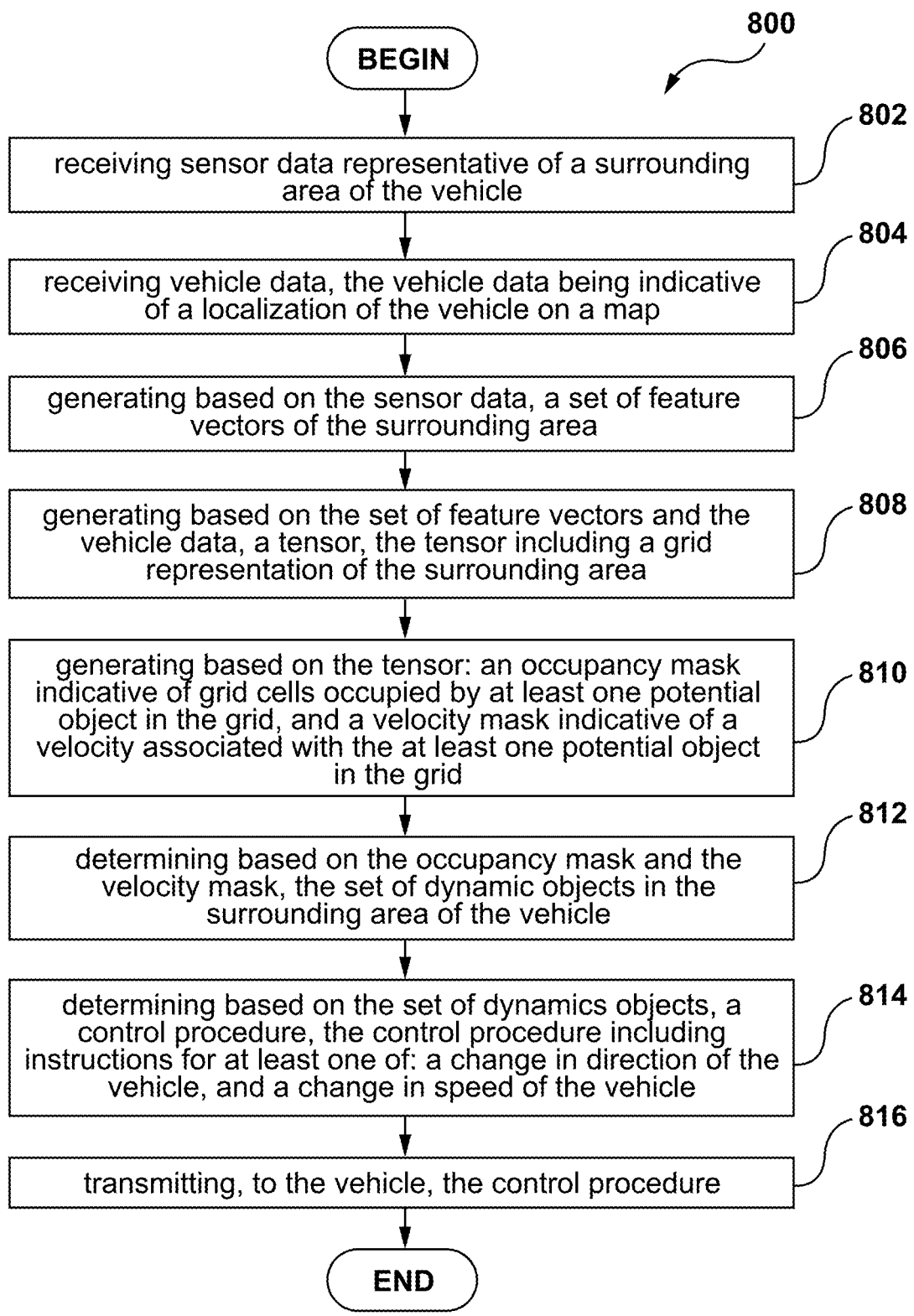
FIG. 8 depicts a flow chart of a method for determining presence of a set of dynamic objects, the method executable in the system of FIG. 1, in accordance with the non-limiting embodiments of the present technology.

With reference to FIG. 8, there is depicted a flow chart of a method 800, the method 800 executable by the processor 110 of the electronic device 210, at least in some non-limiting embodiments of the present technology. It is noted that in at least some non-limiting embodiments of the present technology, the method 800 can be partially or entirely executed by the server 215.

The method 800 begins at step 802.

Step 802: Receiving Sensor Data Representative of a Surrounding Area of the Vehicle At step 802, the vehicle 220 travels on the road 402 and the electronic device 210 acquires, via the second sensor 234, for each moment in time, a LIDAR point cloud 412 to obtain a set of LIDAR point clouds 410.

The method 800 advances to step 804.

Step 804: Receiving Vehicle Data, the Vehicle Data Being Indicative of a Localization of the Vehicle on a Map At step 804, while traveling on the road 402, the electronic device 210 acquires, via the other sensors 238, for each LIDAR point cloud 412, vehicle parameters 432, to obtain a set of vehicle parameters 430.

The method 800 advances to step 806.

Step 806: Generating Based on the Sensor Data, a Set of Feature Vectors of the Surrounding Area At step 806, the electronic device 210 generates, based on the set of LIDAR point clouds 410, a set of feature vectors 540.

In some non-limiting embodiments of the present technology, the electronic device 210 may execute a voxelization procedure 505 to generate a set of voxels 510, prior to generating the set of feature vectors 540. In some non-limiting embodiments of the present technology, the electronic device 210 may execute random sampling 520 of the set of voxels 510.

In some non-limiting embodiments of the present technology, the electronic device 210 applies stacked voxel feature procedure encoding 550 on each given voxel 512 of the set of voxels 510, to obtain the set of feature vectors 540.

In some non-limiting embodiments of the present technology, the electronic device 210 processes the set of feature vectors 540 to obtain a 4D tensor representation 580. The voxel procedure 500 stacks feature in the 4D tensor representation 580 to obtain a 3D tensor representation 590.

The method 800 advances to step 808.

Step 808: Generating Based on the Set of Feature Vectors and the Vehicle Data, a Tensor, the Tensor Including a Grid Representation of the Surrounding Area At step 808, the electronic device 210 generates, based on the 3D tensor representation 590 and the set of vehicle parameters 432, a corrected 3D tensor representation 690 to compensate for ego-motion of the plurality of sensors 230 during acquisition of the set of LIDAR point clouds 410.

In some non-limiting embodiments of the present technology, the electronic device 210 accesses a RNN to generate the corrected 3D tensor representation 690.

The method 800 advances to step 810.

step 810: Generating Based on the Tensor:
an mobility mask indicative of grid cells occupied by at least one potential object in the grid, and
a velocity mask indicative of a velocity associated with the at least one potential object in the grid At step 810, the electronic device 210 generates, based on the corrected 3D tensor representation 590, the grid representation 730, the grid representation 730 including the segmentation mask 740 and the velocity mask 750.

In some non-limiting embodiments of the present technology, the electronic device 210 may access a ResNet to process the corrected 3D tensor representation 690 to obtain a grid representation 730 including the segmentation mask 740 and the velocity mask 750.

The method 800 advances to step 812.

Step 812: Determining Based on the Mobility Mask and the Velocity Mask, the Set of Dynamic Objects in the Surrounding Area of the Vehicle At step 812, the electronic device 210 determines, based on the segmentation mask 740 and the velocity mask 750, the set of dynamic objects 745, each of the at least one dynamic object 747 having a respective estimated velocity 757.

The method 800 advances to step 814.

Step 814: Determining Based on the Set of Dynamics Objects, a Control Procedure, the Control Procedure Including Instructions for at Least one of: a Change in Direction of the Vehicle, and a Change in Speed of the Vehicle At step 814, the electronic device 210 determines, based on the grid representation 730 including segmentation mask 740 and velocity mask 750, a control procedure (not depicted)

In some non-limiting embodiments of the present technology, the electronic device 210 access a MLA to predict future trajectories of the set of dynamic objects 745.

The method 800 advances to step 816.

Step 816: Transmitting, to the Vehicle, the Control Procedure

At step 816, the electronic device 210 transmits, to the vehicle 220, the control procedure for controlling the vehicle 220.

The method 800 then ends.

It should be apparent to those skilled in the art that at least some embodiments of the present technology aim to expand a range of technical solutions for addressing a particular technical problem, namely a method of detecting moving objects in the vicinity of the self-driving vehicle in a glass-agnostic manner (i.e. without having to train the MLA for each specific class of moving objects to be detected). This, in turn, may allow more accurate detection of moving objects around the self driving vehicles, including classes of objects that were not "seen" during training.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method for determining a set of dynamic objects based on sensor data acquired by a sensor mounted on a vehicle, the method being executable by an electronic device, the electronic device being communicatively coupled to the sensor for collection of the sensor data therefrom, the electronic device executing a first machine learning algorithm, MLA, having been trained for object detection based on the sensor data, the method comprising:
   receiving the sensor data representative of a surrounding area of the vehicle;
   generating, by the first MLA, based on the sensor data, a set of feature vectors of the surrounding area;
   receiving vehicle data indicative of a localization of the vehicle on a map;
   generating, by the first MLA, based on the set of feature vectors and the vehicle data, a tensor, the tensor including a grid representation of the surrounding area, wherein the tensor is a 3D tensor representation, and the generating the 3D tensor representation comprises generating a 4D tensor representation based on the set of feature vectors, and stacking features of the set of feature vectors in the 4D tensor representation to obtain the 3D tensor representation;
   generating, by the first MLA, based on the tensor:
      a segmentation mask indicative of grid cells occupied by at least one potential object in the grid, and
      a velocity mask indicative of a velocity associated with the at least one potential object in the grid; and
   determining, by the first MLA, based on the segmentation mask and the velocity mask, the set of dynamic objects in the surrounding area of the vehicle, wherein the electronic device is configured to execute a second MLA, the second MLA being a recurrent neural network, RNN, the vehicle data includes a set of odometer parameters, and the method further comprises correcting, by the second MLA, the 3D tensor representation based on the set of odometer parameters to compensate for an ego-motion of the sensor to obtain a corrected 3D tensor representation.

2. The method of claim 1, wherein
   the sensor is a LIDAR sensor; wherein
   the sensor data includes a set of LIDAR point clouds, each LIDAR point cloud of the set of LIDAR point clouds being associated with a respective timestamp; and
   wherein each odometer parameter of the set of odometer parameters being associated with the respective timestamp.

3. The method of claim 2, wherein
   the odometer parameters include at least one of: gear, wheel rotation speed, inertial measurement unit, IMU, parameters, throttle, steering angle, and speed.

4. The method of claim 3, wherein the generating the set of feature vectors comprises:
   dividing a subset of LIDAR point clouds of the set of LIDAR point clouds into respective sets of voxels;
   applying voxel layers on the respective sets of voxels to obtain the set of feature vectors.

5. The method of claim 1, wherein
   the electronic device executes a third MLA, the third MLA being a residual neural network; and wherein
   the generating the segmentation mask and the velocity mask is executed by the third MLA.

6. The method of claim 5, wherein the electronic device executes a fourth MLA, and the method further comprises:
   determining, by the fourth MLA, based on the set of dynamics objects, a control procedure, the control procedure including instructions for at least one of: a change in direction of the vehicle, and a change in speed of the vehicle; and
   transmitting, by the electronic device to the vehicle, the control procedure.

7. The method of claim 1, wherein dynamic objects of the set of dynamic objects are not associated with a class.

8. The method of claim 1, wherein the set of dynamic objects comprises a first dynamic object of a first class and a second dynamic object of a second class.

9. The method of claim 1, wherein the determining, by the first MLA, based on the segmentation mask and the velocity mask, the set of dynamic objects in the surrounding area of the vehicle is executed independently of a class of a given object of the set of dynamic objects.

10. The method of claim 1, wherein the determining, by the first MLA, based on the segmentation mask and the velocity mask, the set of dynamic objects in the surrounding area of the vehicle further comprises determining, by the first MLA, a predicted velocity for a given one of the set of dynamic objects.

11. The method of claim 10, wherein the determining is executed at a first moment in time, and wherein the method further comprises predicting, by the first MLA, a future position of the given one of the set of dynamic objects at a second moment in time, the second moment in time being after the first moment in time, and optionally wherein the predicting the future position is done at least in part based on the predicted velocity.

12. The method of claim 1, wherein the electronic device is one of: mounted on the vehicle, and located remotely from the vehicle connected thereto via a communication network.

13. An electronic device comprising:
   a processor;
   a non-transitory computer-readable medium comprising instructions, the instructions for executing at least a first machine learning algorithm, MLA, having been trained for object detection based on sensor data, and a second MLA, the second MLA being a recurrent neural network, RNN;
   a communication interface for communicating with a sensor mounted on a vehicle,
   the processor, upon executing the instructions, being configured to:

receive, via the communication interface, sensor data representative of a surrounding area of the vehicle, the sensor data having been collected by the sensor;

generate, via the first MLA, based on the sensor data, a set of feature vectors of the surrounding area;

receive vehicle data indicative of a localization of the vehicle on a map;

generate, via the first MLA, based on the set of feature vectors and the vehicle data, a tensor, the tensor including a grid representation of the surrounding area, wherein the tensor is a 3D tensor representation, and the generate the 3D tensor representation comprises generating a 4D tensor representation based on the set of feature vectors, and stacking features of the set of feature vectors in the 4D tensor representation to obtain the 3D tensor representation;

generate, via the first MLA, based on the tensor:
  a segmentation mask indicative of grid cells occupied by at least one potential object in the grid, and
  a velocity mask indicative of a velocity associated with the at least one potential object in the grid; and determine, via the first MLA, based on the segmentation mask and the velocity mask, a set of dynamic objects in the surrounding area of the vehicle, wherein the vehicle data includes a set of odometer parameters, and the processor is further configured to correct, via the second MLA, the 3D tensor representation based on the set of odometer parameters to compensate for an ego-motion of the sensor to obtain a corrected 3D tensor representation.

\* \* \* \* \*